Nov. 27, 1956  J. L. BUIE  2,772,396

FREQUENCY METER OR THE LIKE

Filed March 3, 1954

JAMES L. BUIE
*INVENTOR.*

BY
HIS ATTORNEY

United States Patent Office 2,772,396
Patented Nov. 27, 1956

2,772,396
FREQUENCY METER OR THE LIKE

James L. Buie, Sun Valley, Calif., assignor to Hoffman Electronics Corporation, a corporation of California Application March 3, 1954, Serial No. 413,894

3 Claims. (Cl. 324—78)

This invention is related to frequency meters designed to measure frequencies in the low-frequency range, and more particularly to an improved frequency meter which will exhibit a high degree of accuracy and lend itself to low-cost manufacture.

In the past, many types of frequency meters have been employed to measure frequencies in the low-frequency range. Invariably certain problems are encountered which render frequency meters presently in use deficient in some respects. In the case of conventional -vibrating-reed meters, frequency ranges are somewhat limited, displays are not continuous, and accuracy is something less than that to be desired. In the case of electronic circuits and counter circuits designed to measure frequency in the low-frequency range, the manufacturing cost of designs presently in use is prohibitive.

Therefore, it is an object of this invention to provide an improved frequency meter for measuring frequencies in the low-frequency range.

It is a further object of this invention to provide an improved frequency meter which will have a wide frequency range, a continuous display, and which will exhibit accuracy, reliability, and lend itself to low-cost manufacture.

According to this invention, the frequency meter consists, principally, of a saturable reactor having a rectangular hysteresis loop and a constant saturation flux density characteristic, a rectifier, and a D'Arsonval-type meter. The D'Arsonval-type meter is calibrated to read frequency directly. The basic principle of the frequency meter is that it performs a voltage-time integration automatically by virtue of the reactor core material, so that the average voltage produced, as recorded by the meter, will be directly proportional to the signal frequency being measured.

The features of the present invention which I believe to be novel are set forth in particularity in the appended claims. The present invention, both as to its organization and manner of operation, together with further objects and advantages thereof, may be best understood by reference to the following description, taken in connection with the accompanying drawings, in which:

Figure 1:
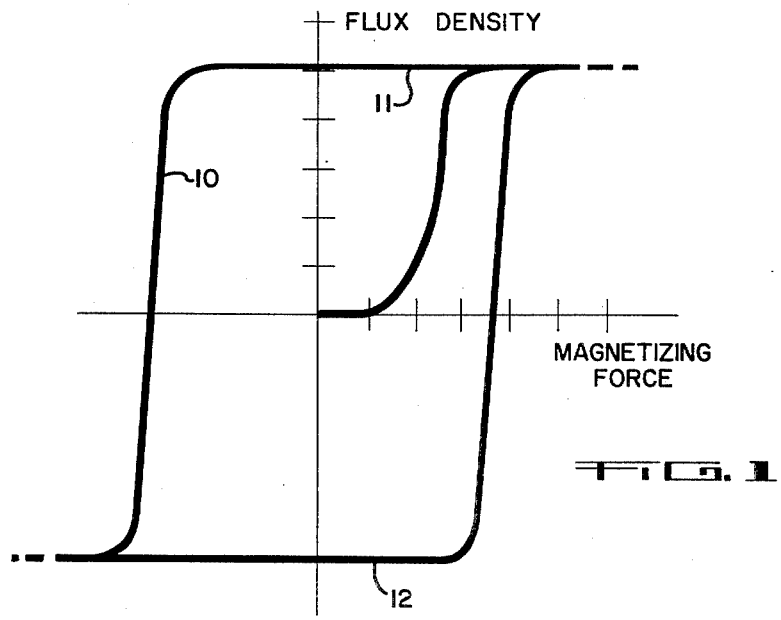
Figure 1 is a diagrammatic representation of a rectangular hysteresis loop exhibited by the core of a reactor employed in the present invention.

There are many materials in production today which exhibit unique characteristics when employed in reactor cores. The particular characteristic which this invention utilizes is that of the rectangular hysteresis loop, as shown in Figure 1. Hysteresis loop 10 is obtained from plotting the magnetizing force exerted upon the core material against resultant flux density. Curve portions 11 and 12 of hysteresis loop 10 indicate that once saturation is achieved, flux density of such a core is independent, to all intent and purposes, of the magnetizing force applied. Further, the magnitude of this flux density, after saturation is achieved, is a very nearly constant value.

Figure 2:
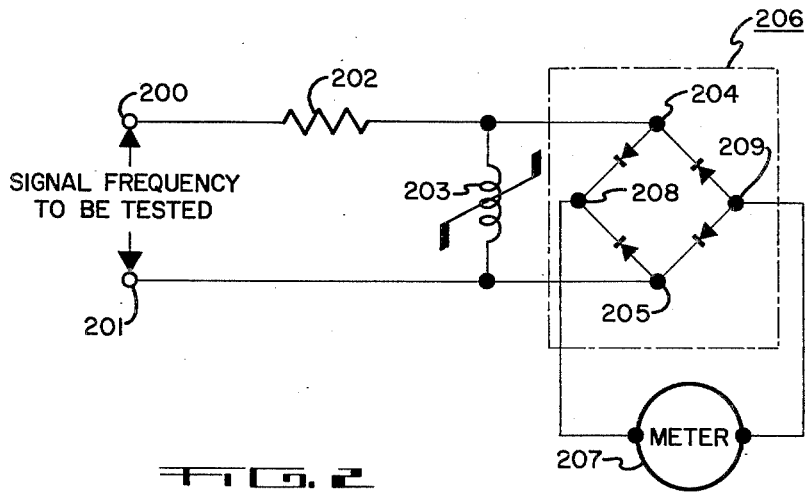
Figure 2 is a schematic diagram of a frequency meter according to the present invention.

In Figure 2, the signal frequency to be tested is impressed across terminals 200 and 201. Terminal 200 is connected through resistor 202 to one end of reactor 203. Terminal 201 is connected to the other end of reactor 203. Reactor 203 has a core which exhibits a rectangular hysteresis loop characteristic, as described in Figure 1. Junctions 204 and 205 of diode bridge circuit 206 are connected to respective ends of reactor 203. D'Arsonval-type meter 207 is connected across junctions 208 and 209 of diode bridge circuit 206.

The circuit of Figure 2 operates as follows. It is recalled from Faraday's law that (1) $$e_i = N \frac{d\phi}{dt} \times 10^{-8}$$

where $e_i$ is the induced voltage in reactor 203, N is the number of turns of the reactor coil, and $$\frac{d\phi}{dt}$$

is the time rate of change of flux produced by current variation in the coil. From Equation 1

(2) $$\int e_i dt = N\phi \times 10^{-8}$$

In Figure 1 it is seen that the total change of flux during each half cycle of line current is equal to twice the saturation flux $\phi_s$ of reactor 203. Hence, (3) $$\int_0^{T/2} e_i dt = 2N\phi_s \times 10^{-8}$$

where T is the period of the impressed sine wave. The average voltage for any waveshape during one-half cycle is (4) $$E_{av} = \frac{2}{T} \int_0^{T/2} e_i dt$$

Therefore, from Equations 3 and 4

(5) $$E_{av} = \frac{4N\phi_s \times 10^{-8}}{T}$$

and as $$f = \frac{1}{T}$$

where $f$ is the frequency, (6) $$E_{av} = 4fN\phi_s \times 10^{-8}$$

or (7) $$E_{av} = 4fNB_sAS \times 10^{-8}$$

where $B_s$ is saturation flux per unit cross-sectional area of the reactor core, A is the cross-sectional area of the core, and S is the core's stacking factor.

It is seen from Equations 6 and 7 that the average induced voltage $E_{av}$ is directly proportional to the line frequency $f$. Thus, as D'Arsonval-type meter 207 is responsive to average voltage, it is seen that meter 207 in the present circuit will read the test signal frequency directly.

It is apparent from the foregoing discussion that this invention provides an accurate frequency determining device employing a minimum number of components. The frequency range of the meter will be limited only to the extent that the hysteresis loop of the reactor core becomes distorted in the higher frequency range. Experiment has shown that the highest degree of linearity is achieved in the 1–400 cycle range; and in this range of operation the percentage error in meter reading may be maintained at less than one-tenth of 1% even though an input voltage of nominally 100 volts may vary in magnitude from as low as 10 to as high as several hundred volts.

The present invention is suited to low-cost manufacture, to compactness, and ruggedness. Certain modifications may be made in the circuit without changing the circuit character. For instance, instead of having diode bridge circuit 206, any full-wave rectifier may be employed. Resistor 202 serves as a current limiting device only.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A frequency meter including, in combination, first and second input terminals, a resistor, and a reactor having first and second terminals, said first input terminal being coupled through said resistor to said first terminal of said reactor, said second input terminal being coupled to said second terminal of said reactor, and said reactor having in addition a saturable core exhibiting constant saturation flux level and a rectangular hysteresis loop; a full-wave rectifier having an input circuit and an output circuit, said rectifier input circuit being coupled across said first and second terminals of said reactor; and a meter having a D'Arsonval-type movement, said meter being coupled to said output circuit of said rectifier.

2. A frequency meter including, in combination, first and second input terminals, a resistor, and a reactor having first and second terminals, said first input terminal being coupled through said resistor to said first terminal of said reactor, said second input terminal being coupled to said second terminal of said reactor, and said reactor also having a saturable core exhibiting constant saturation flux level and a rectangular hysteresis loop; a diode bridge circuit being connected across said first and second terminals of said reactor; and a frequency indicating device having a D'Arsonval-type movement being connected to the junction points of said diode bridge circuit.

3. A frequency meter including, in combination, first and second input terminals, a resistive impedance, and a reactor having first and second terminals, said first input terminal being coupled through said resistive impedance to said first terminal of said reactor, said second input terminal being coupled to said second terminal of said reactor, and said reactor having in addition a saturable core exhibiting constant saturation flux level and a rectangular hysteresis loop; a full-wave rectifier having an input circuit and an output circuit, said rectifier input circuit being coupled across said first and second terminals of said reactor; and a meter having a D'Arsonval-type movement, said meter being coupled to said output circuit of said rectifier.

References Cited in the file of this patent

UNITED STATES PATENTS

| | | |
|---|---|---|
| 671,730 | Mershon | Apr. 9, 1901 |
| 1,755,060 | Gay | Apr. 15, 1930 |
| 2,058,302 | Faus | Oct. 20, 1936 |
| 2,307,316 | Wolff | Jan. 5, 1943 |